Patented Sept. 13, 1938

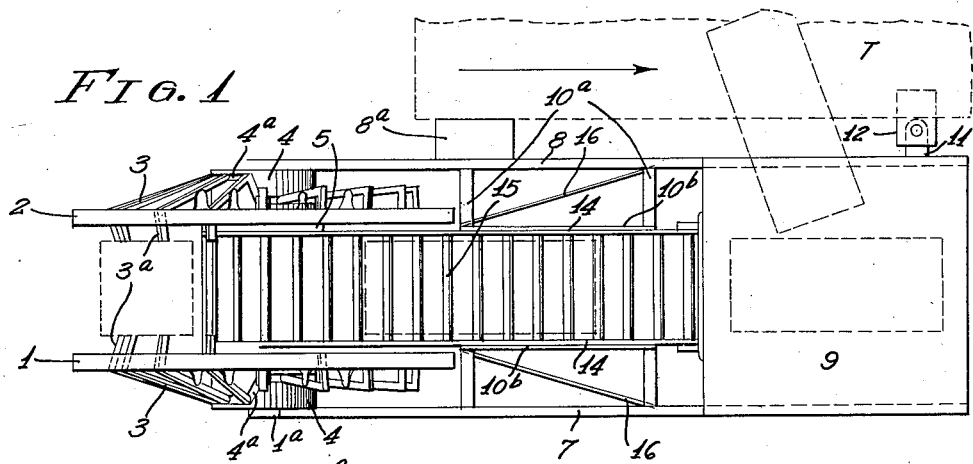
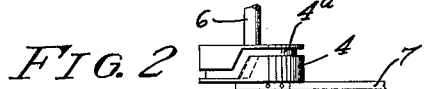
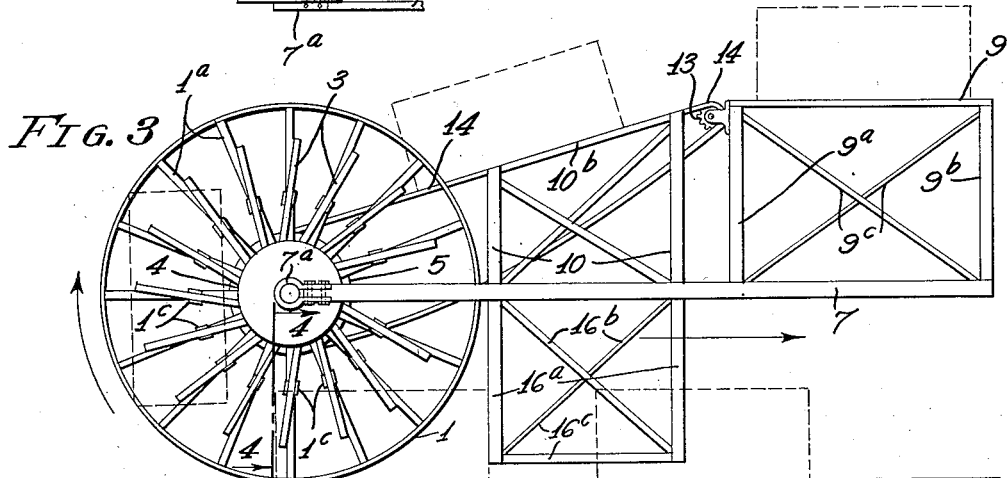
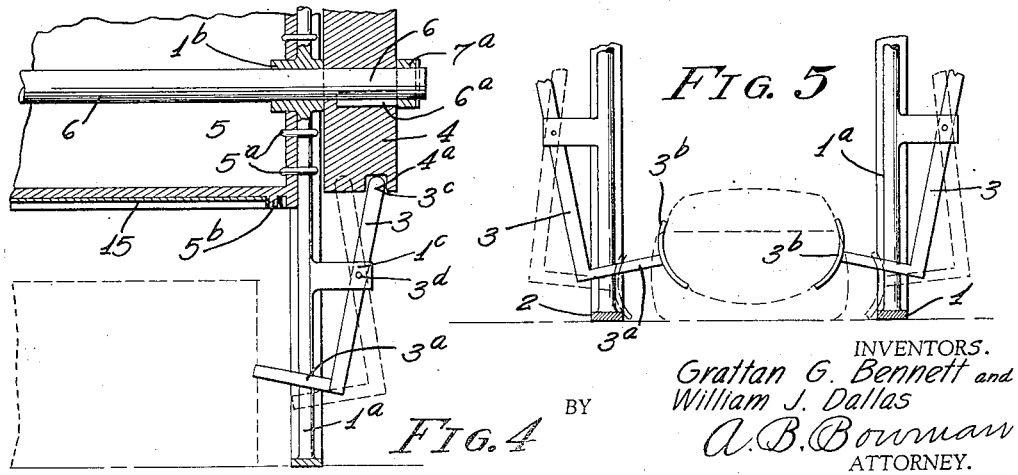

2,130,057

UNITED STATES PATENT OFFICE 2,130,057

LOADING MACHINE

Grattan G. Bennett, Heber, and William J. Dallas, Brawley, Calif.

Application June 25, 1937, Serial No. 150,278

19 Claims. (Cl. 214—91)

Our invention relates to loading machines, more particularly to machines for loading bags of grain, baled hay or the like from the ground in a field onto a truck to which our machine is attached, and the objects of our invention are:

First, to provide a machine of this class which will readily pick up and elevate flexible objects, such as sack grain or similar objects;

Second, to provide such a machine which is also applicable for picking up and elevating more rigid objects such as baled hay or similar objects;

Third, to provide a machine of this class which will readily pick up objects in its path positioned in spaced relation to each other and elevate the same to a position above the bed of a truck to which the machine is attached and through which it is operated;

Fourth, to provide a machine of this class with novel means for picking up objects and elevating them;

Fifth, to provide a machine of this class which may be used in connection with any conventional platform truck and propelled by the same;

Sixth, to provide a machine of this class with automatic means for engaging an object at its opposite sides and elevating the same;

Seventh, to provide a machine of this class which will operate effectively and efficiently on surfaces which are somewhat rough; and Eighth, to provide a machine of this class which is very simple and economical of construction, easily applied to conventional trucks, efficient and durable.

With these and other objects in view as will appear hereinafter, our invention consists of certain novel features of construction, combination, and arrangement of parts and portions as will be hereinafter described in detail and particularly set forth in the appended claims, reference being had to the accompanying drawing, and to the characters of reference thereon which form a part of this application in which:

Figure 1 is a top or plan view of our loading machine showing it connected with a truck platform shown by dash lines fragmentarily and showing an object in the process of transferring from the machine onto the truck by dash lines; Fig. 2 is a fragmentary plan view of one of the cam drums 4 together with its supporting axle 6 and frame member 7; Fig. 3 is a side elevational view of our loading machine showing by dash lines varying positions of an object in the process of being loaded; Fig. 4 is an enlarged fragmentary sectional view taken from the line 4—4 of Fig. 3 and showing the pick-up levers in a varying position by dash lines and showing an object engaged ready for pick-up by dash lines; and Fig. 5 is a fragmentary rear sectional view showing our machine in operative position for picking up a bag of grain.

Similar characters of reference refer to similar parts and portions throughout the several views of the drawing:

The wheels 1 and 2, pick-up levers 3, cam drums 4, main drum 5, axle 6, frame members 7 and 8, platform floor 9, conveyor guide frame 10, hitch members 11 and 12, sprockets 13, conveyor chains 14, and conveyor cross members 15 constitute the principal parts and portions of our loading machine.

The wheels 1 and 2 are the main supporting wheels and are positioned a suitable distance apart to permit the straddling of objects to be loaded. These wheels are provided with a plurality of spokes $1a$. In this case we have shown sixteen which are connected at their inner ends to a hub $1b$ which is revolubly mounted on an axle 6 so that the wheels 1 and 2 are revolubly mounted in spaced relation on this axle 6. Positioned around this axle and supported by links $5a$ around the spokes $1a$ is a main drum member 5 which is provided near its opposite ends on its outer surface with a plurality of sprocket teeeth $5b$. The spokes $1a$ are provided intermediate their ends and extending outwardly with lugs $1c$ which are bifurcated at their ends in which are pivotally mounted intermediate their ends the levers 3 which are pick-up levers for picking up the object. These levers are provided with inwardly extending portions $3a$ which are adapted to engage a bale of hay, straw, or the like and to raise the same with the revolution of the wheel, shown best in Fig. 4 of the drawing. However, where the loading machine is used for bags of grain, or other more flexible objects, the members $3a$ are provided with slightly curved shoes $3b$ which are adapted to engage the surface of the bags as shown best in Fig. 5 of the drawing for raising the same. These levers 3 are rounded at their inner ends $3c$ and are adapted to rest in a cam slot $4a$ in the cam drum 4. This cam drum 4 with the slot $4a$ is shown best in Figs. 2 and 4 of the drawing, and the slot is so arranged in the drum that the lever 3 will be moved on its pivot support $3d$ with the revolution of the wheel 1 or 2 in connection with which it is mounted, the drum 4 being stationary and secured to the axle 6 against tortional movement by means of keys $6a$. This axle 6 is prevented from revolving by means of clamp members $7a$ secured around the ends of the axle and secured to the frame members 7 and 8. Thus, the wheels 1 and 2 revolve while the drum 4 is stationary which provides pivotal movement of the levers 3 by means of the cam groove 4a in the cam drum 4.

The frame members 7 and 8 form the main beams and supports for a platform floor 9 to which the object to be loaded is carried after which it is manually placed onto the truck platform. The frame member 8 is provided near its extended end with the hitch member 11 which is pivotally connected to another hitch member 12 rigidly secured to the side of the truck platform shown best in Fig. 1 of the drawing. This member 8 is also provided with a buffer member 8a which is adapted to engage the side of the truck platform and is preferably resilient to form a cushion. Thus the truck T shown by dash lines forms the means for operating the loader.

Extending upwardly from the frame members 7 and 8 are uprights 9a and 9b at each corner of the platform 9 and form supports for said platform and these members are braced by means of braces 9c on all four sides. Positioned on the members 7 and 8 between the platform and the wheels are other vertical frame members 10 which are mounted on cross members 10a which support guides 10b for a conveyor. This conveyor consists of conveyor chains 14 in spaced relation and positioned on sprockets 13 secured on the upper ends of some of the uprights 9a, and said chain is positioned around the sprocket portions 5b on the drum 5 hereinbefore described. Positioned between the chains 14 are conveyor cross members 15. Thus the conveyor consisting of the chains 14 and across members 15 is supported around the drum 5 and by sprockets 13. The upper end of the conveyor chains 14 are substantially level with the platform 9, shown best in Fig. 3 of the drawing.

Secured to the lower side of the members 7 and 8 at their front ends and to the lower side of the rear member 10a at their rear sides are guides 16 which extend downwardly to near the ground and are tapered as shown best in Fig. 1 of the drawing, preferably made of light sheet metal, and they are reinforced at their edges with reinforcing members 16a and with cross braces 16b and at the lower edge with a reinforcing member 16c. These guide members are for the purpose of engaging the bags or bales or other objects and shifting them toward the middle between the wheels 1 and 2 so that they are easily engaged by the pick-up members.

The operation of our loading machine is as follows: The machine is pivotally connected with the truck or vehicle by means of the hitch members 11 and 12 toward its front end and is adapted to rest against the rear portion of the truck by means of the buffer 8a, the objects to be loaded are strewn in a path on their sides in a row as shown by dash lines in Fig. 3 of the drawing. The machine is moved by the truck in the direction shown by arrows over this row of objects to be picked up so that the wheels 1 and 2 pass on opposite sides of the row. Upon the movement forward of the machine along the row of objects, the members 3a or the members 3b will engage the objects by reason of the pivotal movement of the lever 3, and with the revolution of the wheel, the objects will be carried upwardly as shown by dash lines in Fig. 3 of the drawing and around onto the conveyor slats 15 and carried upwardly by the conveyors on an incline onto the platform 9 where they are manually taken and placed on the platform of the truck, it being noted that where bags or similar flexible objects are to be picked up, the shoe members 3b are provided, while when picking up hay or straw or the like these members may be omitted and the ends of the members 3a engage the bales of straw or hay.

Though we have shown and described a particular construction, combination and arrangement of parts and portions and slight modifications we do not wish to be limited to this particular construction, combination, and arrangement nor to the modifications, but desire to include in the scope of our invention, the construction, combination, and arrangement substantially as set forth in the appended claims.

Having thus described our invention, what we claim as new and desire to secure by Letters Patent is:

1. In a loading machine, a platform pivotally connected at its forward end at one side with the forward portion of a truck, an axle secured in connection with said platform, a pair of ground engaging platform supporting wheels in spaced relation revolubly mounted on said axle, cam drums secured on said axle outwardly of said wheels provided with cam grooves therein, levers pivotally mounted on the spokes of the wheel with their inner ends positioned in said cam grooves and their extended ends extending inwardly between the spokes of the wheel.

2. In a loading machine, a platform pivotally connected at its forward end at one side with the forward portion of a truck, an axle secured in connection with said platform, a pair of ground engaging platform supporting wheels in spaced relation revolubly mounted on said axle, cam drums secured on said axle outwardly of said wheels provided with cam grooves therein, levers pivotally mounted on the spokes of the wheel with their inner ends positioned in said cam grooves and their extended ends extending inwardly between the spokes of the wheel, sprockets secured to said wheel, other sprockets revolubly mounted in close proximity to said platform, and a conveyor mounted on said sprockets on said wheels and on said platform.

3. In a loading machine, a platform pivotally connected at its forward end at one side with the forward portion of a truck, an axle secured in connection with said platform, a pair of ground engaging platform supporting wheels in spaced relation revolubly mounted on said axle, cam drums secured on said axle outwardly of said wheels provided with cam grooves therein, levers pivotally mounted on the spokes of the wheel with their inner ends positioned in said cam grooves and their extended ends extending inwardly between the spokes of the wheel, sprockets secured to said wheel, other sprockets revolubly mounted in close proximity to said platform, a conveyor mounted on said sprockets on said wheels and on said platform, and curved members mounted in connection with said levers for engagement with the side walls of the bag of grain.

4. In a loading machine of the class described, the combination with a self-propelled vehicle, of a platform pivotally connected with one side thereof, a pair of spaced ground engaging platform supporting wheels revolubly mounted on said platform at its free end, an elevating conveyor positioned on said platform in operative connection with said wheels, lever members pivotally connected with the spokes of said wheels and extending inwardly between said spokes and stationary means for rocking said levers with the revolution of said wheels.

5. In a loading machine of the class described, the combination with a self-propelled vehicle, of a platform pivotally connected with one side thereof, a pair of spaced ground engaging platform supporting wheels revolubly mounted on said platform at its free end, an elevating conveyor positioned on said platform in operative connection with said wheels, lever members pivotally connected with the spokes of said wheels and extending inwardly between said spokes and stationary means for rocking said levers with the revolution of said wheels, said means including a cam member secured in connection with said frame provided with a groove in which the one end of said levers are positioned.

6. In a loading machine of the class described, the combination with a self-propelled vehicle, of a platform pivotally connected with one side thereof, a pair of spaced ground engaging platform supporting wheels revolubly mounted on said platform at its free end, an elevating conveyor positioned on said platform in operative connection with said wheels, lever members pivotally connected with the spokes of said wheels and extending inwardly between said spokes and stationary means for rocking said levers with the revolution of said wheels, said elevating conveyor including spaced chains and cross bars secured to said chains.

7. In a loading machine of the class described, a wheel supported platform connected to and adapted to be propelled by a separate driven vehicle, pick-up members pivotally connected with the wheels on said platform and extending inwardly through said wheels, and means in connection with said wheels for rocking said pick-up members through said wheels.

8. In a loading machine of the class described, a wheel supported platform connected to and adapted to be propelled by a separate driven vehicle, pick-up members pivotally connected with the wheels on said platform and extending inwardly through said wheels, means in connection with said wheels for rocking said pick-up members through said wheels including a cam drum secured in connection with said platform outwardly of said wheels and arranged to engage said pick-up members.

9. In a loading machine of the class described, a wheel supported platform connected to and adapted to be propelled by a separate driven vehicle, pick-up members pivotally connected with the wheels on said platform and extending inwardly through said wheels, means in connection with said wheels for rocking said pick-up members through said wheels including a cam drum secured in connection with said platform outwardly of said wheels and arranged to engage said pick-up members, and an elevating conveyor secured to said wheels and said platform and operable by said wheels.

10. In a loading machine of the class described, a wheel supported platform connected to and adapted to be propelled by a separate driven vehicle, pick-up members pivotally connected with the wheels on said platform and extending inwardly through said wheels, means in connection with said wheels for rocking said pick-up members through said wheels including a cam drum secured in connection with said platform outwardly of said wheels and arranged to engage said pick-up members, an elevating conveyor secured to said wheels and said platform and operable by said wheels, and curved shoe means in connection with said pick-up members at their inner extremities.

11. In a loading machine of the class described, a wheel supported platform connected to and adapted to be propelled by a separate driven vehicle, pick-up members pivotally connected with the wheels on said platform and extending inwardly through said wheels, means in connection with said wheels for rocking said pick-up members through said wheels including a cam drum secured in connection with said platform outwardly of said wheels and arranged to engage said pick-up members, and curved shoe means in connection with said pick-up members at their inner extremities.

12. In a loading machine of the class described, a platform provided with wheels at one end adapted to be propelled by a separate driven vehicle and supported at one end thereby, pick-up members pivotally connected on the outer sides of the wheels of said loading machine, said pick-up members provided at their extended ends with portions extending inwardly through said wheels, stationary cam means in engagement with said pick-up members for rocking the same with the revolution of said wheels.

13. In a loading machine of the class described, a platform provided with wheels at one end adapted to be propelled by a separate driven vehicle and supported at one end thereby, pick-up members pivotally connected on the outer sides of the wheels of said loading machine, said pick-up members provided at their extended ends with portions extending inwardly through said wheels, stationary cam means in engagement with said pick-up members for rocking the same with the revolution of said wheels, and an elevating conveyor operated by said wheels and supported by the forward end of said loading machine.

14. In a loading machine of the class described, a platform provided with wheels at one end adapted to be propelled by a separate driven vehicle and supported at one end thereby, pick-up members pivotally connected on the outer sides of the wheels of said loading machine, said pick-up members provided at their extended ends with portions extending inwardly through said wheels, stationary cam means in engagement with said pick-up members for rocking the same with the revolution of said wheels, an elevating conveyor operated by said wheels and supported by the forward end of said loading machine, said pick-up members provided with curved shoes at their inwardly extending ends.

15. In a loading machine, a platform pivotally connected at its forward end at one side with the forward portion of a vehicle, an axle secured in connection with said platform, a pair of wheels in spaced relation revolubly mounted on said axle, cam drums secured on said axle outwardly of said wheels provided with cam grooves therein, levers pivotally mounted on the spokes of the wheel with their inner ends positioned in said cam grooves and their extended ends extending inwardly between the spokes of the wheel.

16. In a loading machine of the class described, a wheel supported platform connected to and adapted to be propelled by a separate vehicle, pick-up members pivotally connected with the spokes of the wheels on said platform and extending inwardly between the spokes of said wheels, and means in connection with said wheels for rocking said pick-up members on said wheels.

17. In a loading machine of the class described, a wheel supported platform connected to and adapted to be propelled by a separate vehicle, pick-up members pivotally connected with the spokes of the wheels on said platform and extending inwardly between the spokes of said wheels, means in connection with said wheels for rocking said pick-up members on said wheels including a cam drum secured in connection with said platform and arranged to engage said pick-up members, and an elevating conveyor in connection with said wheels and said platform and operable by said wheels.

18. In a loading machine of the class described, a wheel supported platform connected to and adapted to be propelled by a separate vehicle, pick-up members shiftably mounted between the spokes of said wheels adapted to shift inwardly and outwardly between said spokes and means in connection with said pick-up members for shifting them inwardly and outwardly between the spokes of said wheels with the revolution of said wheels.

19. In a loading machine of the class described, a wheel supported platform connected to and adapted to be propelled by a separate vehicle, pick-up members shiftably mounted between the spokes of said wheel adapted to shift inwardly and outwardly between said spokes and means in connection with said pick-up members for shifting them inwardly and outwardly between the spokes of said wheels with the revolution of said wheels, said pick-up members provided with curved extremities at their inner ends for engaging an article to be picked up.

GRATTAN G. BENNETT.
WILLIAM J. DALLAS.